US011919561B2

(12) United States Patent
Leboeuf et al.

(10) Patent No.: US 11,919,561 B2
(45) Date of Patent: Mar. 5, 2024

(54) VEHICLE STEERING WHEEL WITH MOVABLE STRUCTURE AND LOCKING DEVICE

(71) Applicant: AUTOLIV DEVELOPMENT AB, Vargarda (SE)

(72) Inventors: Thomas Leboeuf, Ouzilly (FR); Matthis Barritault, Poitiers (FR); Benoît Mourrain, Poitiers (FR)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 17/995,659

(22) PCT Filed: Apr. 12, 2021

(86) PCT No.: PCT/EP2021/059458
§ 371 (c)(1),
(2) Date: Oct. 6, 2022

(87) PCT Pub. No.: WO2021/205039
PCT Pub. Date: Oct. 14, 2021

(65) Prior Publication Data
US 2023/0182801 A1    Jun. 15, 2023

(30) Foreign Application Priority Data

Apr. 6, 2020  (FR) .................................. FR2003409
Mar. 5, 2021  (FR) .................................. FR2102148

(51) Int. Cl.
*B62D 1/04*    (2006.01)
*B62D 1/10*    (2006.01)

(52) U.S. Cl.
CPC . *B62D 1/10* (2013.01); *B62D 1/04* (2013.01)

(58) Field of Classification Search
CPC ............. B62D 1/10; B62D 1/105; B62D 1/04
See application file for complete search history.

(56) References Cited

U.S. PATENT DOCUMENTS 10,196,081 B2 *  2/2019  Markfort ............. E05B 47/0004
10,562,558 B1     2/2020  Spahn et al.
(Continued)

FOREIGN PATENT DOCUMENTS

CN    205381300 U    7/2016
DE    202016005986 U1    1/2018
(Continued)

*Primary Examiner* — Adam D Rogers
(74) *Attorney, Agent, or Firm* — Matthew D. Thayne; Thayne and Davis LLC

(57) ABSTRACT

A vehicle steering wheel comprising a central part; a movable structure comprising at least a portion of a rim pivotally mounted with respect to the central part (120, 16) between: a locked position and at least one retracted position; an actuator for pivoting the movable structure between its locked position and its retracted position; a locking device which is movably mounted between an engaged position for locking the movable structure in its locked position, and a disengaged position allowing the pivoting of the movable structure, wherein the locking device comprises a hinge portion, a locking portion arranged to lock the movable structure, a locking arm connecting the hinge portion and the locking portion, wherein the locking arm comprises a resilient inner hinge to allow recovery of mechanical play between the locking portion and the movable structure.

20 Claims, 5 Drawing Sheets

(56) References Cited

U.S. PATENT DOCUMENTS

| | | | | |
|---|---|---|---|---|
| 10,710,627 B2* | 7/2020 | Kreutz | ................. | B62D 1/10 |
| 11,180,177 B1* | 11/2021 | Aktas | ................. | B62D 1/06 |
| 11,230,315 B2* | 1/2022 | Kastelic | ................. | B62D 1/08 |

FOREIGN PATENT DOCUMENTS

| | | | |
|---|---|---|---|
| DE | 202017107359 U1 | | 1/2018 |
| KR | 20230030430 A | * | 3/2023 |
| WO | 2018109039 A1 | | 6/2018 |

* cited by examiner

[Fig. 1]
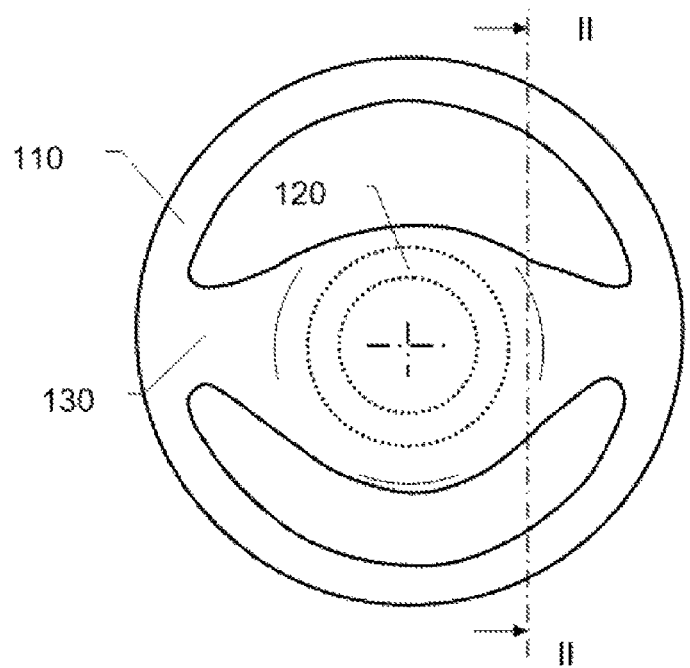
[Fig. 2]
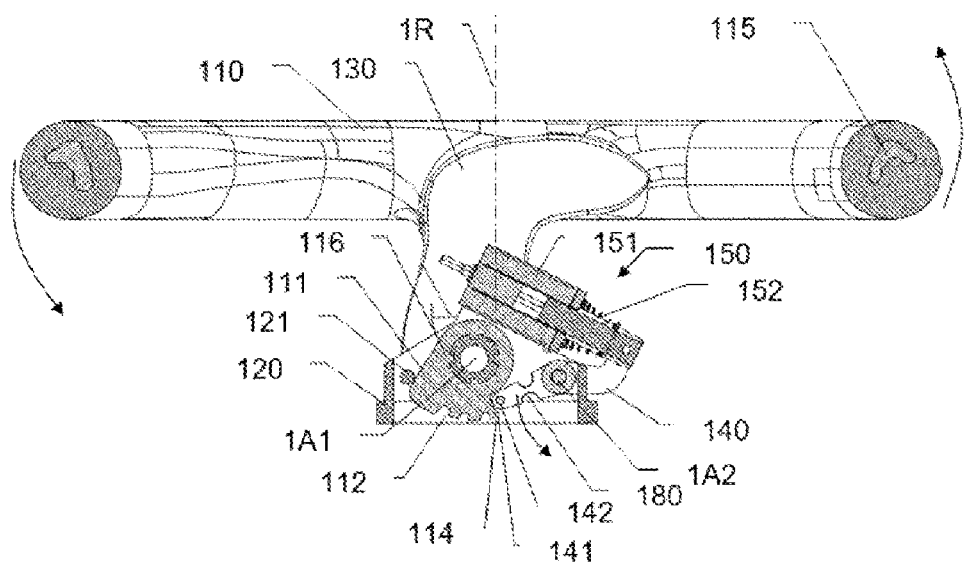

[Fig. 3]
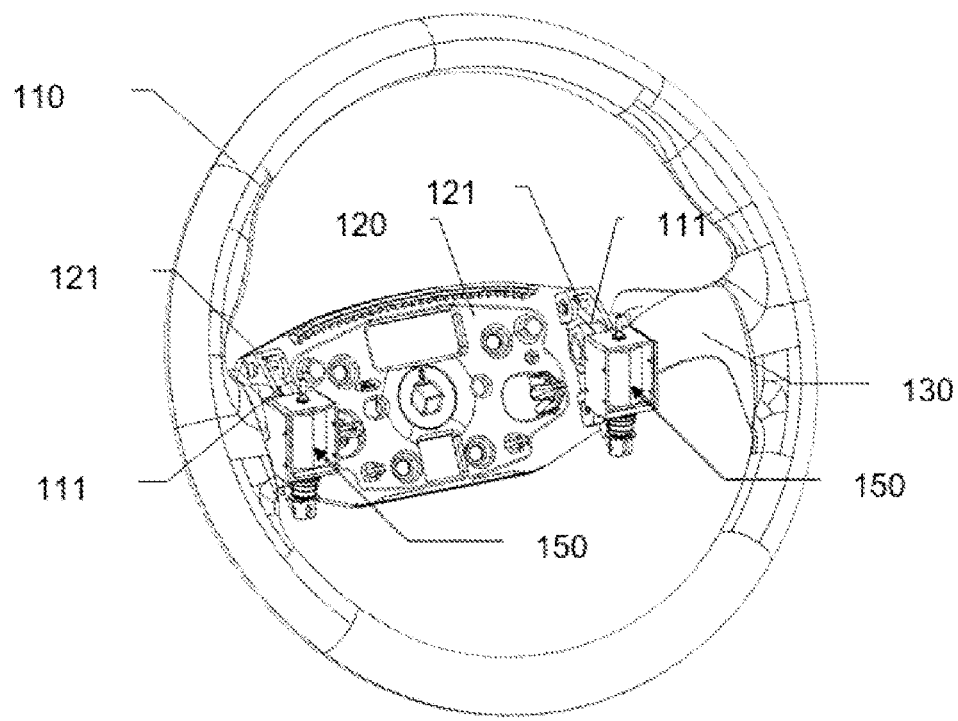
[Fig. 4]
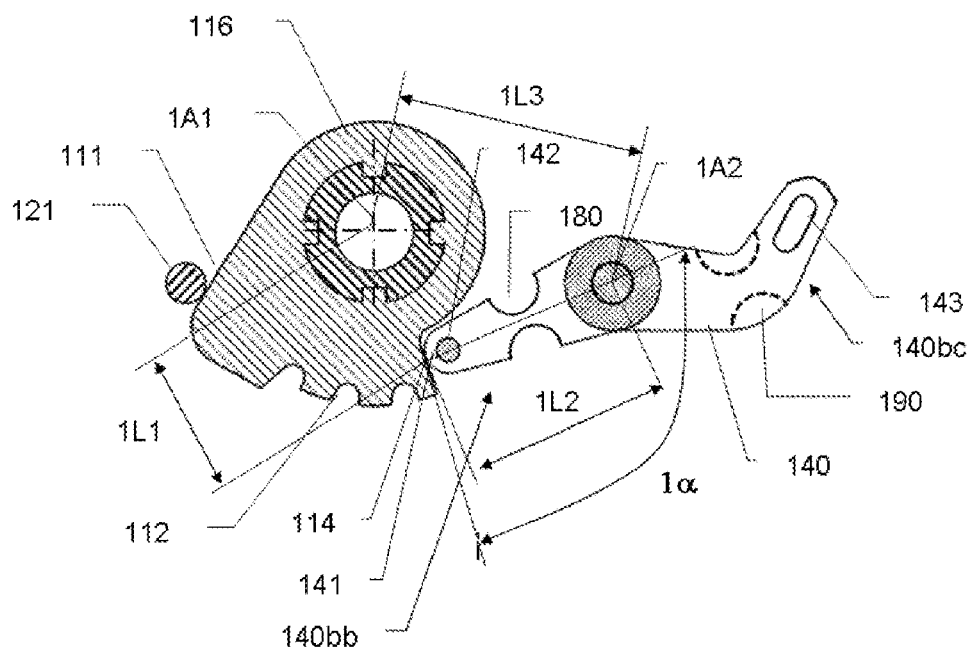

[Fig. 5]
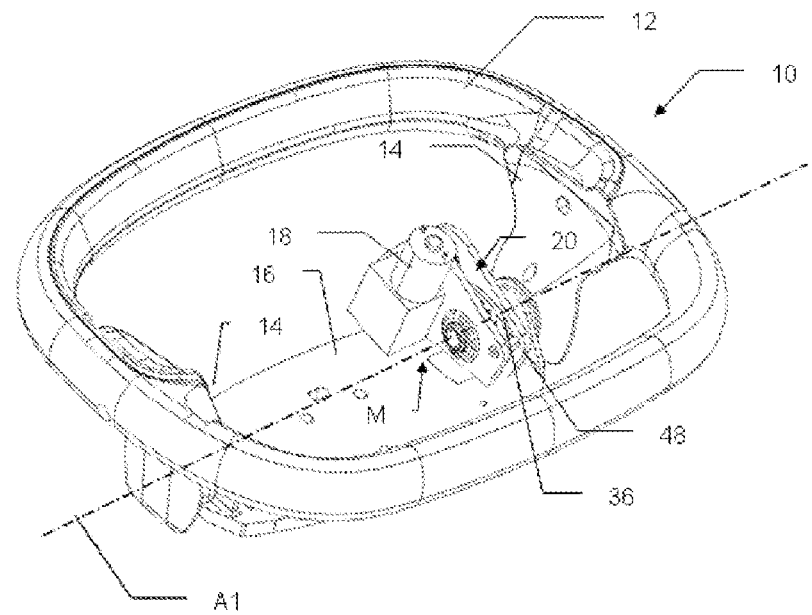
[Fig. 6]
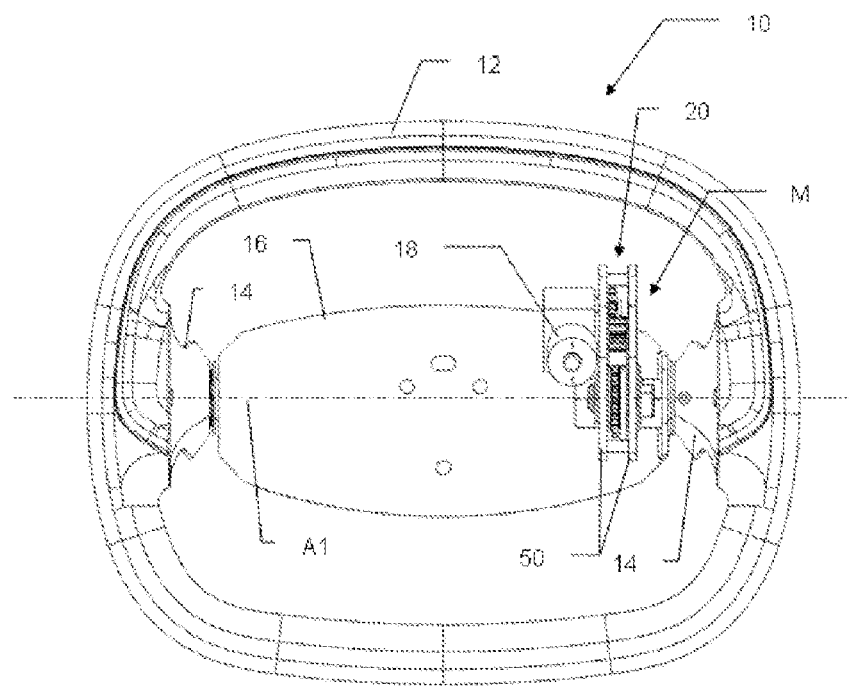

[Fig. 7]
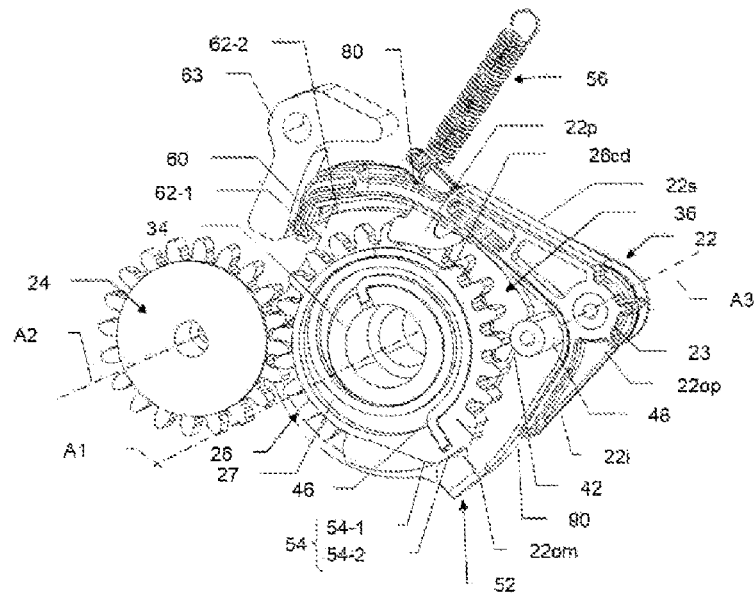
[Fig. 8A]
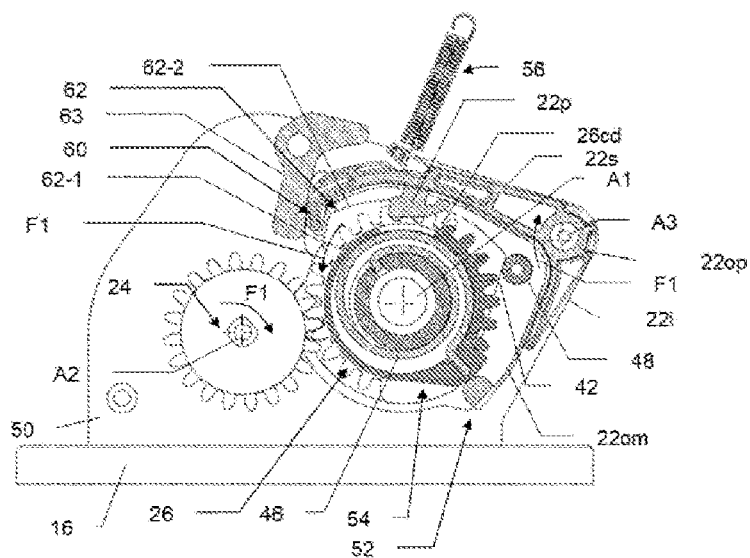

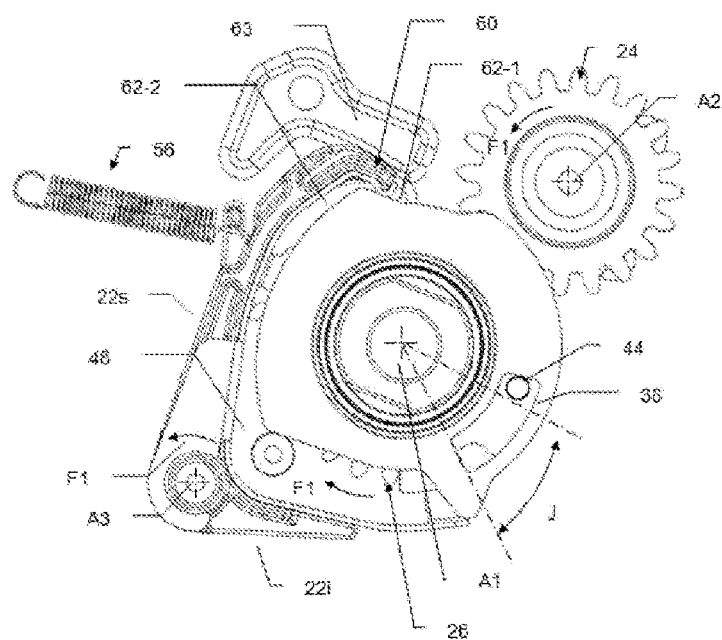
[Fig.8B]

VEHICLE STEERING WHEEL WITH MOVABLE STRUCTURE AND LOCKING DEVICE

TECHNICAL FIELD OF THE INVENTION

This invention generally relates to a vehicle steering wheel intended for being mounted on an automotive vehicle. In particular, the invention relates to a vehicle steering wheel comprising a movable structure comprising at least one part of the rim of the steering wheel.

STATE OF THE ART

In the prior art of vehicle steering wheels, a motorized folding steering wheel system is known, for example from document U.S. Pat. No. 10,562,558 B1, comprising: a steering wheel having a rim forming a substantially continuous ring which is pivotably connected to a central structure which is configured to be mounted on a steering column, and comprising an electric motor which is configured to pivot the rim from a vertical position—corresponding to a state allowing the vehicle to be driven—to a substantially horizontal stowed or retracted position, allowing other uses of the steering wheel and its rim. Additionally, the steering wheel system comprises one or more additional system(s) for locking the rim in its vertical driving position, each of which is presented in the form of a dedicated locking system. Such a design is especially bulky, heavy, expensive and requires precise adjustments to operate.

DISCLOSURE OF THE INVENTION

One object of the present invention is to address the above-mentioned drawbacks of the prior art and in particular, first of all, to propose a vehicle steering wheel comprising a movable structure (for example at least one rim part) which can be moved with respect to a central part, and which can be locked in at least one position (for example a driving position) with a locking device that allows operation without noise or locking, while taking into account the dimensional variations of the parts or inevitable manufacturing play.

A first aspect of the invention therefore relates to a vehicle steering wheel comprising:
  a central part;
  a movable structure comprising at least one portion of a rim mounted pivotably with respect to the central part between:
    a locked position, for example a driving position in which the vehicle can be steered by a driver;
    and at least one retracted position;
  an actuator for pivoting the movable structure between its locked position and its retracted position (optionally);
  a locking device that is mounted movably between an engaged position for locking the movable structure in the locked position thereof, and a released position allowing the movable structure to pivot,
wherein the locking device comprises:
  a hinge portion forming a hinge with the central part,
  a locking portion arranged to lock the movable structure,
  a locking arm connecting the hinge portion and the locking portion,
characterized in that the locking arm comprises a resilient inner hinge which may allow recovery of dimensional variations of parts or mechanical play between the locking portion and the movable structure.

The steering wheel according to the embodiment hereinbefore comprises a locking device with a resilient inner hinge which grants internal flexibility to the locking arm. Thus, manufacturing play (typically present between the hinge portion and the part of the movable structure interacting with the locking portion) can be taken up by a resilient deformation of the locking arm. As a consequence, even if dimensional tolerances in the manufacture of parts or play are present due to manufacturing tolerances, this play will be taken up and will not prevent movement of the locking portion, or operation without noise or rattling.

According to one embodiment, the resilient inner hinge can be formed by a local reduction of the moment of inertia of the locking arm. The local reduction means that the inner hinge has a moment of inertia that is lower than the moment of inertia of a portion of the adjacent locking arm located on the side of the hinge portion, and lower than the moment of inertia of a portion of the adjacent locking arm located on the side of the locking portion.

According to one embodiment, the local reduction of the moment of inertia of the locking arm can be obtained by a local reduction of the cross-section of the locking arm. In other words, the resilient inner hinge is formed by a locally thinned portion of the locking arm.

According to one embodiment, the local reduction of the moment of inertia at the resilient inner hinge of the locking arm can be:
  at least 30% with respect to an adjacent portion of the locking arm on the side of the hinge portion, and/or
  at least 20% with respect to an adjacent portion of the locking arm on the side of the locking portion.

According to one embodiment, the resilient inner hinge can be arranged at a distance from the hinge portion comprised between 40% and 60% of the length of the locking arm. The position of the resilient inner hinge will determine the deflection or the relative movement of the locking portion with respect to the hinge portion and thus the play value that can be taken up.

According to one embodiment, the resilient inner hinge (for example the reduction of the cross-section of the resilient inner hinge, for example the position of the resilient inner hinge on the locking arm), can be dimensioned taking into account, on the one hand, a locking force or torque applied to the locking device and in particular to the locking arm, and/or on the other hand, a maximum play or a maximum dimensional variation of the parts in question, so as to guarantee sufficient relative movement between the locking portion and the hinge portion, in order to take up/compensate for the maximum play or maximum dimensional variation in question.

According to one embodiment, the locking device may comprise:
  a control portion arranged to be actuated by an actuator,
  a control arm connecting the control portion to the hinge portion,
and the control arm can comprise a secondary resilient inner hinge which can enable another recovery of mechanical play between the locking portion and the movable structure.

The locking device comprises a secondary resilient inner hinge which grants internal flexibility to the control arm. Thus, manufacturing play (typically present between the hinge portion and the part of the actuator interacting with the control portion) can be taken up by a resilient deformation of the control arm. As a consequence, even if play is present due to manufacturing tolerances, this play will be taken up and will not prevent control of the movement of the locking portion, or operation without noise or rattling.

According to one embodiment, the secondary resilient inner hinge can be formed by a local reduction of the moment of inertia of the control arm. The local reduction means that the secondary resilient inner hinge has a moment of inertia that is lower than the moment of inertia of a portion of the adjacent control arm located on the side of the hinge portion, and lower than the moment of inertia of a portion of the adjacent control arm located on the side of the control portion.

According to one embodiment, the local reduction of the moment of inertia of the control arm can be obtained by a local reduction of the cross-section of the control arm. In other words, the secondary resilient inner hinge is formed by a locally thinned portion of the control arm.

According to one embodiment, the local reduction of the moment of inertia at the secondary resilient inner hinge of the control arm can be at least 30% with respect to an adjacent portion of the control arm on the side of the hinge portion.

According to one embodiment, the secondary resilient inner hinge can be arranged at a distance from the hinge portion comprised between 50% and 90% of the length of the control arm, i.e. on the side of the control portion.

According to one embodiment, the secondary resilient inner hinge (for example the reduction of the cross-section of the secondary resilient inner hinge, for example the position of the secondary resilient inner hinge on the control arm), can be dimensioned taking into account, on the one hand, a control force or torque applied to the locking device and in particular to the control arm, and/or on the other hand, a maximum play or a maximum dimensional variation of the parts in question, so as to guarantee sufficient relative movement between the control portion and the hinge portion, to take up/compensate for the maximum play or maximum dimensional variation in question.

According to one embodiment, the locking device can comprise a metal frame and a plastic frame coupled to the metal frame. In particular, the locking device can comprise a composite fork formed by the metal frame and by the plastic frame, which makes it possible to combine a light part (plastic frame) and one that can locally withstand high contact pressures or large resilient deformations (metal frame).

According to one embodiment, the local reduction of the moment of inertia of the locking arm can be granted by a local reduction of the moment of inertia of the plastic frame.

According to one embodiment, the local reduction of the moment of inertia of the control arm can be granted by a local reduction of the moment of inertia of the plastic frame. Preferably, the secondary resilient inner hinge, and/or the control arm part located on the side of the control portion, can lack a plastic frame.

According to one embodiment, at the locking portion, the metal frame can be arranged between the movable structure and the plastic frame. In other words, in engaged position, it is the metal frame that will be in contact with the movable structure in order to lock it in the locked position. This makes it possible to guarantee low coefficients of friction, and/or high contact pressures/small contact surfaces without damaging the structure.

According to one embodiment, the metal frame can be formed by a sheet of steel or a sheet of stainless steel.

According to one embodiment, the plastic frame can be formed in polymer, preferably filled with reinforcement fibers, such as glass fiber-filled polyamide.

According to one embodiment, the vehicle steering wheel can comprise an unlocking member driven by an actuator to force the locking device to move from the engaged position to the released position. Such an unlocking member can guarantee the return to the released position by positive contact, even if the locking arm or the control arm are deformed resiliently in order to compensate for the play. Such an unlocking member can consist of a projection, a slider or a cam that acts directly on the locking device, and for example be part of the metal frame in order to ensure robust and durable operation.

According to one embodiment, the vehicle steering wheel can comprise a locking cam driven by an actuator to force the locking device to move from the released position to the engaged position and can comprise a cam plate for holding the engaged position during at least part of the travel of the actuator. Such a cam plate makes it possible to guarantee the raising of the cam or the final position during a whole part of the travel of the actuator, which makes it possible to compensate for the play or manufacturing tolerances.

According to one embodiment, the vehicle steering wheel can comprise a static abutment rigidly connected to the central part, wherein the locking portion of the locking device in the engaged position can be arranged to push a movable abutment of the movable structure to bear on the static abutment so as to impose the locked position on the movable structure. In other words, the movable structure can comprise a first driving position abutment (the movable abutment), the central part can comprise a second driving position abutment (the static abutment), which abut on one another and make it possible to define the locked position, and the locking device can be arranged to push the first driving position abutment onto the second driving position abutment so as to lock the movable structure in the locked position while taking up the play. In particular, the static abutment is mounted on the hub according to a recessed connection, so as to be stationary with respect to the hub.

According to one embodiment, the static abutment rigidly connected to the central part, can be arranged on the path of the movable abutment of the movable structure in order to define the locked position. No relative movement is to be expected between the hub and the static abutment, or between the movable structure and the movable abutment in order for the static abutment to bear on or be in contact with the movable abutment.

According to one embodiment, the vehicle steering wheel can comprise a secondary static abutment rigidly connected to the central part, the locking portion can be arranged to be inserted between the secondary static abutment and a locking section of the movable structure, when the locking device moves from the released position to the engaged position. The secondary static abutment can be a locking guide and the locking portion, moving toward the engaged position, is inserted between the locking guide and the movable structure. As a consequence, in engaged position, the locking portion is between the movable structure and the secondary static abutment, which improves the locking and the holding in locked position, even with the resilient inner hinge which "weakens" the rigidity of the locking device. Indeed, the holding in locked position is transferred to the secondary static abutment, and the locking portion is a "wedge" engaged between the movable structure in locked position and the secondary static abutment. In particular, the secondary static abutment is mounted on the hub according to a recessed connection, so as to be stationary with respect to the hub.

According to one embodiment, the locking device can be formed by the assembly of a resilient member with a rocker.

According to one embodiment, the resilient member can form the secondary inner hinge. Another possibility is to form the control arm with the resilient member, for example an elastic band.

A second aspect of the invention relates to a vehicle steering wheel comprising:
- a hub or a central part,
- a movable structure comprising at least one portion of a rim of the steering wheel, articulated with respect to the hub so as to be movable between a driving position (or locked position) wherein the rim can be grasped by a user in order to drive the vehicle and at least one console position wherein the user can place an object on the rim, wherein the movable structure comprises a first driving position abutment and the hub comprises a second driving position abutment arranged to come into mechanical abutment with the first driving position abutment when the movable structure is moved from the console position to the driving position so as to define the driving position, locking means comprising a locking member arranged to lock the movable structure in the driving position, characterized in that the locking means comprise a control member, arranged to exert a pushing force on the locking member such that, when the movable structure is in driving position, the locking member pushes the first driving position abutment against the second driving position abutment.

The vehicle steering wheel according to the embodiment hereinbefore comprises a control member which generates a pushing force on the locking member in order to hold the second driving position abutment constantly in contact with the first driving position abutment, when the movable structure is in driving position. Thus, the vibrations applied to the steering wheel do not generate noise, since the second driving position abutment is constantly in contact with the first driving position abutment: the hinged movable structure does not tap on the hub.

In particular, the first driving position abutment can be embedded and static with respect to the movable structure while the second driving position abutment can be embedded and static with respect to the hub. According to one embodiment, the locking member can comprise at least one rocker. A rocker offers more freedom to position the control member in a compact environment. Indeed, a bevel gear offers the possibility of offsetting the control member, and the lever arm allows the strokes to be adjusted.

According to one embodiment, the movable structure can be movable with respect to the hub according to a rotation about a first axis of rotation, and wherein the rocker can be rotationally movable with respect to the hub according to a rotation about a second axis of rotation, parallel to the first axis of rotation. In other words, the two axes of rotation are contained in a single plane and are parallel. The pushing forces thus effectively generate torque, since the two axes of rotation are parallel.

According to one embodiment, when the movable structure is in driving position and when the locking member pushes the first driving position abutment against the second driving position abutment:
- a distance between the first axis of rotation and a point of contact between the locking member and the movable structure is denoted L1,
- a distance between the second axis of rotation and the point of contact between the locking member and the movable structure is denoted L2,
- a distance between the first axis of rotation and the second axis of rotation is denoted L3, wherein L1+L2 can be greater than L3.

According to one embodiment, the control member can be mounted stationary with respect to the hub. This embodiment further limits the risks of rattling or unwanted noise.

According to one embodiment, the control member can be connected to the locking member by at least one linear straight connection formed for example by a rod sliding in an oblong hole.

According to one embodiment, the movable structure can comprise at least one locking portion, and, when the movable structure can be in said at least one console position, the locking member can be arranged to couple with said at least one locking portion, in order to keep the movable structure in said at least one console position. This is the same locking member that performs the locking in driving position and in console position, which limits the costs and reduces the bulk.

According to one embodiment, the movable structure can comprise several locking notches, and the locking member can be arranged to couple with each locking notch, so as to define several console positions for the movable structure. It is possible to provide a first console position with a rim portion folded horizontally in order to rest a notebook computer thereon, for example. It is possible additionally to provide a second console position, wherein the hinged part of the rim is tilted, in order to rest a tablet thereon, for example.

According to one embodiment, the plurality of locking notches can form a rack, and the locking member can comprise a locking projection, such as a tooth or a rod or a shaft, arranged to couple with the rack. A rack makes it possible to provide several console positions with a reduced cost, and is also the same locking member which performs the position locking.

According to one embodiment, the movable structure can comprise a pushing surface, and the locking member can comprise a pushing projection arranged to engage with the pushing surface when the movable structure is in driving position, in order to push the first driving position abutment against the second driving position abutment. According to this embodiment, the locking member comprises two separate interfaces: one for locking the hinged movable structure in driving position, and another for locking the hinged movable structure in console position.

According to one embodiment, when the movable structure is in driving position and when the locking member pushes the first driving position abutment against the second driving position abutment, then, at the point of contact between the locking member and the movable structure, an angle, between a tangent to the surface of the locking member and a tangent to the surface of the movable structure, can be greater than an angle of the cone of friction defined by a coefficient of friction between the locking member and the movable structure. This embodiment makes it possible to avoid jamming.

According to one embodiment, when the movable structure is in driving position, the first driving position abutment can be arranged between the second driving position abutment and the locking member.

According to one embodiment, the control member can comprise at least one electromechanical actuator, such as an electromagnet. In other words, the control member is not manual. As a consequence, the holding in driving position can be provided by a member which is controlled by the vehicle. The control can thus be subjected to conditions, for example such that the vehicle is stopped, or that the parking brake is on, or even that the steering wheel is disengaged from the steering column. Thus, it is impossible to place the steering wheel in console position if the vehicle is in movement, or in manual driving phase.

According to one embodiment, the control member can comprise at least one resilient return member, such as a spring, arranged to generate the pushing force. The holding in driving position is guaranteed by the resilient return member, which does not require electric energy. In other words, when the movable structure is in driving position, the first driving position abutment is pushed constantly against the second driving position abutment by a spring, and an electric member (an electromagnet) can momentarily compress the spring in order to release the locking member and allow the passage into console position.

The resilient return member also serves to compensate for the play and guarantees the absence of rattling or unwanted noise.

A third aspect of the invention relates to an automotive vehicle comprising a vehicle steering wheel according to one of the preceding claims.

DESCRIPTION OF THE FIGURES

Other features and advantages of the present invention will become more apparent upon reading the following detailed description of embodiments of the invention, which are provided by way of non-limiting examples and illustrated by the attached drawings, in which:

FIG. 1 depicts a front view of a vehicle steering wheel according to a first embodiment of the present invention;

FIG. 2 depicts a cross-section of the steering wheel of FIG. 1;

FIG. 3 depicts a perspective view of a part of the vehicle steering wheel of FIG. 1;

FIG. 4 depicts a detail of the cross-section of FIG. 2;

FIG. 5 is a perspective view of a second embodiment of a vehicle steering wheel which is depicted in the driving position of the rim;

FIG. 6 is a top view of the steering wheel depicted in FIG. 5;

FIG. 7 is a large-scale perspective detail view which depicts certain components of the movement-transmission mechanism which equips the steering wheel depicted in FIGS. 5 and 6;

FIG. 8A is a front view of the components depicted in FIG. 7;

FIG. 8B is a rear view of the components depicted in FIG. 7.

FIRST EMBODIMENT—MANUAL MOVEMENT OF A MOVABLE STRUCTURE OF A STEERING WHEEL WITH ASSISTED LOCKING IN POSITION

FIG. 1 depicts a steering wheel according to a first embodiment of the invention, comprising a rim 110 connected by arms 130 to a hub (forming a central part 120) arranged to be coupled to a steering column of the vehicle or to an electric steering gear box.

In order to improve the ergonomics for using the vehicle, the rim 110 is hinged with respect to the hub, so as to be able to be positioned either in a locked so-called driving position (wherein the plane of the rim 110 is typically perpendicular to an axial direction of the hub coinciding with an axis of rotation of the steering wheel during the driving of the vehicle), or in a retracted so-called console position (wherein the plane of the rim 110 is then tilted with respect to the axial direction of the hub, so that a user can place for example a computer on the rim 110).

In the detail, a movable structure comprising the rim 110, at least one part of the arms 130 and an inner part with an eccentric 116 is pivotably mounted with respect to the hub forming the central part 120. As shown by the cross-section of FIG. 2, the movable structure is mounted rotatably movable on the hub in order to pivot about a first axis of rotation 1A1.

According to the depicted example, the rim 110 comprises a frame 115, which also forms a frame of the arms 130 and of the central part with the eccentric 116. This frame can be typically integral and produced by injection, but it is possible to contemplate a frame in several parts, with or without machined portions.

In FIG. 2, the movable structure is in the locked so-called driving position and comprises a first driving position abutment 111 (or movable abutment) which is in contact with a second driving position abutment 121 (or static abutment) rigidly connected to the hub. In the driving position, the steering wheel is arranged so as to be pivoted about a steering wheel axis 1R (which is both the axial direction of the hub as well as the axis of a steering column when the vehicle is provided with a steering column) in order to drive the vehicle, and the rim 110 can be generally perpendicular to this steering wheel axis 1R.

It is important to guarantee that there is no unwanted noise during the driving of the vehicle, even if vibrations are transmitted to the steering wheel and to the movable structure. A locking member 140 (or blocking member) is then provided, which is a rocker, for constantly pushing the first driving position abutment 111 against the second driving position abutment 121 and holding the movable structure in locked position. To this end, the locking member 140 comprises a pushing projection (forming a locking portion 141) arranged to come into contact with a pushing surface 114 of the movable structure and to push it against the second driving position abutment 121.

In order to obtain this effect, the steering wheel comprises a control member 150 comprising especially an electromagnet 151 and a spring 152 connected to the locking member 140. In the configuration depicted in FIG. 2, the control member 150 exerts, via the spring 152, a continuous force on the locking member 140 so that the latter constantly exerts a force to push the first driving position abutment 111 against the second driving position abutment 121. Thus, the pushing force is generated by the spring 152, which does not require electric energy, and the driving position is guaranteed without play or unwanted noise.

In order to move the movable structure, it is necessary to unlock the latter from the hub, and for this purpose, the control member 150 can be actuated (by a control button, for example) so that the electromagnet 151 retracts and drives the locking member 140 in a counterclockwise rotation as the arrow of FIG. 2 shows. Thus, the pushing projection separates from the pushing surface 114, and the movable structure and in particular the rim 110 can pivot in a counterclockwise direction about the first axis of rotation 1A1, as shown by the two arrows about the rim 110. In the embodiment depicted, the rim 110 is pivoted manually but an actuator such as a motor, for example a stepping motor, can also be used. It may only be powered once the control member 150 is activated.

The first driving position abutment 111 separates from the second driving position abutment 121 and one of the three notches 112 forming an intermediate portion for locking the movable structure arrives opposite one rod 142 of the locking member 140 forming a locking projection. The control member 150 can then pivot the locking member in the clockwise direction in order to insert the rod 142 into one of the notches 112, so as to lock the movable structure and the rim 110 in a console position. In this position not shown, the rim 110 is then tilted with respect to the axis of the steering wheel 1R, and a user can place objects on the rim (papers, a computer, a tablet, etc.). It is noted that the movable structure comprises three notches 112, and advantageously, one of these notches is provided so that the rim 110 is horizontal or substantially horizontal in console position.

FIG. 3 depicts a perspective view of a part of the vehicle steering wheel of FIG. 1, wherein a part of the trim is not shown. In order to guarantee correct holding of the movable structure and of the rim 110, two control members 150 are distributed on either side of the central part of the hub. Two first driving position abutments 111 and two second driving position abutments 121 are thus provided in order to effectively lock the movable structure and the rim 110 in driving position as shown.

Furthermore, it can be noted that the control members 150 are mounted stationary on the hub, i.e. according to a recessed-type connection (all the degrees of freedom between these parts are locked) in order to avoid any unwanted noise.

FIG. 4 depicts a detail of FIG. 2, with the eccentric 116, the second driving position abutment 121 and the locking member 140. In connection with the stationary mounting of the control members 150, it can be noted that the locking member 140 comprises an oblong hole 143 that receives a control shaft of the control member 150 (not shown), in order to allow isostatic mounting with a linear-type connection between the oblong hole 143 and the control shaft of the control member 150.

The spring 152 visible in FIG. 2 makes it possible to guarantee that the play will be taken up and that no unwanted noise is generated by this connection between the oblong hole 143 and the control shaft of the control member 150.

As mentioned hereinbefore, the locking member 140 is a rocker, which pivots about a second axis of rotation 1A2, parallel to the first axis of rotation 1A1.

In order to guarantee correct holding in driving position, when the locking member 140 pushes the first driving position abutment 111 onto the second driving position abutment 121:
- a distance between the first axis of rotation 1A1 and a point of contact between the locking member 140 and the movable structure is denoted 1L1,
- a distance between the second axis of rotation 1A2 and the point of contact between the locking member 140 and the movable structure is denoted 1L2,
- a distance between the first axis of rotation 1A1 and the second axis of rotation 1A2 is denoted 1L3, the following inequality is provided:

$$1L1+1L2>1L3$$

Moreover, FIG. 4 depicts an angle 1α between the pushing surface 114 of the eccentric 116 and a straight line connecting the second axis of rotation 1A2 at the point of contact between the locking member and the eccentric 116. In order to ensure constant contact between the parts when the movable structure and rim 110 are in driving position, the angle 1α is provided to be strictly greater than 90°. In the detail, it is noted that the angle 1α is formed between a tangent to the pushing surface 114 of the eccentric 116 (at the point of contact) and a straight line connecting the second axis of rotation 1A2 to the point of contact between the locking member and the eccentric 116, in the case wherein the pushing surface 114 is curved and/or non-planar.

Thus, in driving position, the locking member 140 effectively pushes the first driving position abutment 111 against the second driving abutment position 121, in order to guarantee reliable holding in position without unwanted noise.

Finally, it can be noted in FIGS. 2 and 4 that the locking member 140 has a thinned portion on a locking arm 140bb defined between the hinge on the shaft 1A2 and the pushing projection (forming a locking portion 141). The thinned portion forms a resilient inner hinge 180 which provides increased flexibility between the hinge of axis 1A2 and the locking portion 141 (the pushing projection). Such a thinned portion indeed locally reduces the moment of inertia of the locking arm 140bb. A relative movement of the locking portion 141—pushing projection with respect to the hinge of axis 1A2 is facilitated and makes it possible to easily compensate for play due to inevitable manufacturing tolerances.

It suffices to adjust the remaining thickness at the resilient inner hinge 180 (or the position of the resilient inner hinge 180 on the locking arm 140bb) in order to allow a given relative movement (for example the maximum play given by a dimension chain calculation) between the locking portion 141—pushing projection with respect to the hinge of axis 1A2, depending on the force exerted by the control member 150.

It is also entirely possible to provide a secondary resilient inner hinge 190 on a control arm 140bc of the locking member 140 defined between the hinge of axis 1A2 and the oblong hole 143, as shown by the two dotted curved lines in FIG. 4 which define material recesses for producing such a secondary resilient inner hinge 190. Similar to the resilient inner hinge 180, the secondary resilient inner hinge 190 appears to grant internal flexibility to the locking member 140 which appears to allow recovery of manufacturing play.

It will be understood that various modifications and/or improvements which are obvious for the person skilled in the art may be made to the different embodiments of the invention described in the present description, without departing from the scope of the invention. In particular, reference is made to an eccentric 116 which carries the first driving position abutment 111, the notches 112 and the pushing surface 114, but any other embodiment may be contemplated.

In addition, it is noted that the locking member 140 is a rocker, but a rod, a bevel gear, or any other force transmission member could be contemplated. It can also be contemplated for the locking member 140 to be integrated into the control member 150 in order to form a specific part thereof (a bearing slide integrated directly into an electromagnet), as long as a resilient inner hinge is provided between a hinge portion or anchor point on the stationary part and a locking portion which interacts with the movable structure.

SECOND EMBODIMENT—AUTOMATIC OR ASSISTED MOVEMENT OF THE MOVABLE STRUCTURE AND ASSISTED AND SEQUENTIAL LOCKING IN POSITION

FIGS. 5 and 6 depict a steering wheel 10 comprising a rim 12 connected by arms 14 to a central part 16, also referred to as hub, which is arranged to allow the coupling of the steering wheel to a steering column of the vehicle or to an electric steering gear box (not shown).

In order to improve the ergonomics of use of the vehicle, the rim 12 is at least partly mounted hinged with respect to the central part 16, so as to be able to pivot in both directions about a primary axis A1 orthogonal to the axis of rotation of the steering wheel, in order to be positioned angularly:

either in a so-called driving position wherein the plane of the rim 12 is typically orthogonal to an axial direction of the central part 16 which coincides with the axis of rotation of the steering wheel and of the steering column during the driving of the vehicle;

or in a retracted position, also referred to as console position, wherein the plane of the rim 12 is thus tilted with respect to the direction of the central part 16, especially so that a user can for example place a computer on the rim 12.

The possibility of changing the angular position is not necessarily limited to pivoting the entire rim 12, but can also relate to only a portion of the rim 12—for example only one half of the rim, such a rim portion constituting a movable structure of the rim in the sense of the invention.

By convention, the primary pivoting axis A1 of the rim 12 is oriented axially from rear to front in FIG. 5.

By way of non-limiting example, in order to pivot the rim 12 in both directions, the steering wheel 10 comprises herein a side module M for pivoting and locking the rim 12. The side module M is arranged herein adjacent to the rear arm 14 of the steering wheel 10 (FIG. 5).

The module M essentially combines a motorized actuator 18, a mechanism 20 for transmission between the actuator and the rim 12, and a member 22 for locking the rim 12 in its driving position.

FIG. 7 depicts:

a movement input gear 24 belonging to the transmission mechanism which is rotated about a secondary axis A2 by the actuator 18 of FIG. 6;

a gear 26 for pivoting the rim 12 which meshes permanently with the input gear 24 (by way of non-limiting example, the drive sprocket 26 is mounted rotatably about the primary pivoting axis A1 of the rim 12);

a locking rocker 22 shaped as a fork which comprises a central hub 23 that is mounted pivotably with respect to the reinforcement plates 50 about a locking axis A3 parallel to the primary A1 and secondary axes A2 of the drive sprocket 26 and of the input gear 24, respectively, a locking guide 63, rigidly connected to the central part, and thus "static".

From its hinge portion (its central hub 23), the locking rocker 22 has two opposing radial arms including an arm 22i, a so-called control arm, which is lower in view of the figures, and an upper arm 22s, a so-called locking arm.

At its free end, the control arm 22i has a circumferential cam-follower element 52 which engages with an L-shaped cam profile section 54 which is supported and which is rotated by the rim 27 of the drive sprocket 26.

The cam-follower element 52 is permanently biased resiliently against the cam profile 54 by a locking spring 56 that permanently biases the locking rocker 22 to rotate in the clockwise direction in view of FIGS. 7 and 8A.

At its free end, the locking arm 22s has a circumferential locking lip (forming a locking portion 60) which is able to engage with a locking section 62 of the peripheral edge 37 of the radial plate 36 of the hub 34 which, herein, is in two consecutive parts 62-1 and 62-2, substantially at right angles. The locking arm also comprises a slide 22p that can engage with projections 26cd of the gear 26, in order to move the locking rocker 22 in the clockwise direction of FIG. 7 or 8A and unlock the locking of the rim 12, as will be seen hereunder.

The locking rocker 22 can advantageously be a composite part with a plastic frame 22op and a metal frame 22om which are snap-fit or overmolded together. It can be noted that the metal frame 22om is preferentially arranged to come into contact with other components, for example such as the radial plate 36, the cam track 54, and the projections 26cd of the gear 26 (the slide 22p is formed in the metal frame 22om), so that the plastic frame 22op is not provided to be in contact with other parts. Such an embodiment makes it possible to limit the coefficients of friction, wear and scratches.

The plastic frame 22op can be made of plastic polymer and can preferably be filled with fibers. It is possible to choose polyamide, preferably polyamide 6.6. It is also possible to provide inserts made of metal or different materials at certain locations, like an anti-friction slide made of polytetrafluoroethylene arranged opposite the locking guide 63. It is possible to fill the polymer material with glass fibers, for example to 30%.

The metal frame 22 m can be a sheet of steel or stainless steel. Spring steel can also be provided.

For the rotational connection in both directions between the drive sprocket 24 and the rim 12, FIG. 3 also depicts a hub 34 that is capable of being rotatably secured to the rim 12 and which extends axially through the drive sprocket 26. At its rear, the hub is rotatably secured to a radial plate 36 of which the peripheral edge 37 has an opening, herein in the form of a notch 38 visible in FIG. 8B, open radially outward, the locking section 62, and an abutment section 42.

In order to make it possible to pivot the hub 34 in an offset manner with respect to the pivoting of the locking member 22, the rear radial face of the drive sprocket 26 has a catch pin 44 visible in FIG. 8B, which extends axially toward the rear and which is permanently received in the notch 38 with an angular clearance "J" enabling a relative angular movement between the drive sprocket 26 and the hub 34. Additionally, a spring 46, herein produced in the form of a spiral spring, is inserted between the drive sprocket 26 which extends axially forward and the hub 34. The spring 46 permanently ensures an elastic return of the drive sprocket 26 with respect to the radial plate 36 of the hub 34 in the angular position depicted in FIGS. 7, 8A and 8B, a so-called rest position.

As can be seen in FIGS. 5 and 6, the module M herein has two parallel reinforcement plates 50 between which the input gears 24 and drive sprockets 26 are arranged, as well as the radial plate 36 of the hub 34 and the locking member 22, these various components also being mounted so as to rotate with respect to these two reinforcement plates 50. In addition, the motorized actuator 18 is attached to the front reinforcement plate 50.

Additionally, a stationary axial abutment pin 48 is arranged between the two reinforcement plates 50 and is able to engage with the abutment section 42 facing the peripheral edge of the radial plate 36 of the hub 34.

In FIGS. 7, 8A and 8B, the rim 12, and the set of associated components, is depicted in its so-called angular driving position in which it is locked by the locking member 22.

The angular driving position of the rim 12, about its primary pivoting axis A1, is determined by the angular abutment of the abutment section 42 of the peripheral edge 37 of the radial plate 36 of the hub 34 in contact against the stationary axial abutment 48.

In the state of the rim 12 locked in driving position depicted in FIGS. 7, 8A and 8B, the cam-follower element 52 bears against the radially outermost portion 54-1 of the cam profile 54 and the locking lip—locking portion 60, positioned between the locking guide 63 and the radial plate 36, engages with the part 62-1 of the locking section 62. In this state of the various components, it is impossible for the radial plate 36 and the hub 34 to rotate in the clockwise direction in view of FIGS. 5 and 6A (arrow F1). The locking guide 63 takes up the forces applied to the rim 12, and guarantees the absence of play, sandwiching the locking lip with the radial plate 36.

Starting from this position depicted in FIGS. 8A and 8B, to unlock the rim 12, and then pivot it toward a console position, it is necessary to drive the input gear 24 in the direction of the arrow F1 indicated in these figures.

The first part of the angular travel of the input gear 24 according to F1 causes the immediate rotation of the drive sprocket 26 and of the cam profile 54 as well as of the projections 26*cd*. The cam-follower element 52 then leaves the radially outermost portion 54-1 of the cam profile 54 and descends along the tilted, radially innermost portion 54-2 of the cam profile 54. The slide 22*p* comes into contact with the projections 26*cd* and, under the action of the locking spring 56, this imposes and causes the locking fork 22 to pivot according to the arrow F1 and the locking lip—locking portion 60 to separate.

During this first part of the angular travel of the input gear 24 according to F1, the input gear 24 drives the drive sprocket 26 and its axial catch pin 44 which then moves inside the notch 38, and does so against the resilient return force exerted by the spring 46.

As soon as the catch pin 44 has reached the other angular end of the notch 38, after compensating for the clearance "J", the first portion of the travel of the angular travel of the input gear 24 according to F1 is ended and its rotation continues, always according to the arrow F1, along a second part of its travel, then driving the radial plate 36 and thus the hub 34 and the rim 12.

This rotation is possible because the locking lip—locking portion 60 then bears on the part 62-2 forming a cylindrical arc of the locking section 62.

Thus, the rim 12 is pivoted toward its console position, or retracted position, in an offset manner with respect to the driving of the locking member 22 which is first pivoted by the input gear 24 in order to first ensure the unlocking of the rim 12.

Via the engagement of the axial catch pin 44 with the notch 38 of the radial plate 36 of the hub 34, the toothed input gear 24 meshes indirectly with the rim 12 in order to pivot it toward the retracted position thereof in an offset manner with respect to the driving of the locking member 22.

Consecutively, starting from a console position and in order to return to the driving position, the input gear 24 is rotated against the arrow F1, the abutment section 42 of the peripheral edge 37 of the radial plate 36 of the hub 34 comes back into contact with the stationary axial abutment pin 48 and then the locking member 22 is only pivoted in the opposite direction to the arrow F1, thanks to the possibility of moving the catch pin 44 back into the notch 38.

Regardless of the embodiment, according to the invention, the input gear 24 constitutes a toothed input member for the movement to be transmitted to the at least one drive sprocket 26.

Alternatively, it is possible to replace the input gear 24 with an inner crown gear or even with an optionally straight toothed rack.

The actuator 18 is for example a rotary electric motor which is optionally associated with a gearbox or with a gear reducer to form an electric gear motor. In this case, a rotating output shaft drives—directly or indirectly—the toothed input member such as the input gear 24.

Alternatively, the output shaft can drive a screw of a worm-and-nut system in order to drive a toothed input member in both directions via a rack member.

Finally, it can be noted especially in FIGS. 7 and 8A that the locking member 22 has a thinned portion on the locking arm 22*s* defined between the hinge of locking axis A3 and the locking lip (forming a locking portion 60). The thinned portion forms a resilient inner hinge 80 which provides increased flexibility between the hinge of locking axis A3 and the locking portion 60 (the locking lip). Such a thinned portion indeed locally reduces the moment of inertia of the locking arm. A relative movement of the locking portion 60—locking lip with respect to the hinge of locking axis A3 is facilitated and makes it possible easily to compensate for play due to inevitable manufacturing tolerances.

It suffices to adjust the remaining thickness at the resilient inner hinge 80 (or the position of the resilient inner hinge 80 on the locking arm 22*s*) in order to allow a given relative movement (for example the maximum play given by a dimension chain calculation) between the locking portion 60—locking projection with respect to the hinge of locking axis A3, depending on the force exerted by the actuator 18. In particular, the resilient inner hinge makes it possible to compensate for or take up play or variations in manufacturing dimensions at the parts located between the locking axis A3 and the periphery 37 of the radial plate 36.

It can be noted that the resilient inner hinge is mainly formed by a reduction in the cross-section of the plastic frame 22*op*.

It can also be noted that a secondary resilient inner hinge 90 is provided on the control arm 22*i* of the locking member 22 defined between the hinge of locking axis A3 and the cam-follower element 52 (forming a control portion), as shown in FIGS. 7 and 8A. The secondary resilient inner hinge 90 is formed halfway along the length of the control arm, with the plastic frame 22*op* which has its end at this location, so that the moment of inertia of the control arm drops sharply, which provides increased flexibility of the control arm, which can compensate for or take up play or variations in manufacturing dimensions at the parts located between the locking axis A3 and the cam follower 52 and/or the cam track 54.

It will be understood that various modifications and/or improvements which are obvious for the person skilled in the art may be made to the different embodiments of the invention described in the present description, without departing from the scope of the invention.

The invention claimed is:

1. A vehicle steering wheel comprising:
   a central part;
   a movable structure comprising at least one portion of a rim mounted pivotably with respect to the central part between:
   a locked position, wherein the vehicle can be steered by a driver;
   and at least one retracted position;
   a locking device which is mounted movably between an engaged position for locking the movable structure in the locked position thereof, and a released position allowing the movable structure to pivot, wherein the locking device comprises:
- a hinge portion forming a hinge with the central part,
- a locking portion arranged to lock the movable structure,
- a locking arm connecting the hinge portion and the locking portion, and wherein the vehicle steering wheel further comprises:
  - a static abutment rigidly connected to the central part, wherein the locking portion of the locking device in the engaged position is arranged to push a movable abutment of the movable structure to bear on the static abutment so as to impose the locked position on the movable structure.

2. The vehicle steering wheel according to claim 1, wherein the locking arm comprises a resilient inner hinge, and wherein the resilient inner hinge is formed by a local reduction of a moment of inertia of the locking arm.

3. The vehicle steering wheel according to claim 2, wherein the local reduction of the moment of inertia in the resilient inner hinge of the locking arm is:
- at least 30% with respect to an adjacent portion of the locking arm on the side of the hinge portion, and/or
- at least 20% with respect to an adjacent portion of the locking arm on the side of the locking portion.

4. The vehicle steering wheel according to claim 2, wherein the locking device comprises:
- a control portion arranged to be actuated by an actuator,
- a control arm connecting the control portion to the hinge portion, wherein the control arm comprises a secondary resilient inner hinge.

5. The vehicle steering wheel according to claim 4, wherein the locking device comprises a metal frame and a plastic frame coupled to the metal frame.

6. The vehicle steering wheel according to claim 5, wherein a local reduction of a moment of inertia of the locking arm is provided by a local reduction of a moment of inertia of the plastic frame.

7. The vehicle steering wheel according to claim 5, wherein a local reduction of a moment of inertia of the control arm is provided by a local reduction of a moment of inertia of the plastic frame, and the secondary resilient inner hinge, and/or the control arm located on the side of the control portion, lacks the plastic frame.

8. The vehicle steering wheel according to claim 5, wherein, at the locking portion, the metal frame is arranged between the movable structure and the plastic frame.

9. The vehicle steering wheel according to claim 4, wherein the actuator is mounted in a stationary position with respect to the central part.

10. The vehicle steering wheel according to claim 4, wherein the locking arm is configured to push the movable abutment against the static abutment, wherein, when the movable structure is in the locked position and when the locking arm pushes the movable abutment against the static abutment, at a point of contact between the locking arm and the movable structure, an angle is formed between a tangent to a surface of the locking arm and a tangent to a surface of the movable structure, and wherein the angle is greater than an angle of a cone of friction defined by a coefficient of friction between the locking arm and the movable structure.

11. The vehicle steering wheel according to claim 4, wherein, when the movable structure is in the locked position, the movable abutment is configured to be positionable between the static abutment and the locking arm.

12. The vehicle steering wheel according to claim 1, comprising an unlocking member driven by an actuator to force the locking device to move from the engaged position to the released position.

13. The vehicle steering wheel according to claim 1, comprising a locking cam driven by an actuator to force the locking device to move from the released position to the engaged position and comprising a cam plate for holding the engaged position during at least part of the travel of the actuator.

14. The vehicle steering wheel according to claim 1, comprising a secondary static abutment rigidly connected to the central part, wherein the locking portion is arranged to be inserted between the secondary static abutment and a locking section of the movable structure, when the locking device moves from the released position to the engaged position.

15. The vehicle steering wheel according to claim 1 in combination with an automotive vehicle.

16. The vehicle steering wheel according to claim 1, wherein the movable structure is configured to be rotationally movable with respect to the central part about a first axis of rotation, and wherein the locking arm is configured to be rotationally movable with respect to the central part about a second axis of rotation, the second axis of rotation being parallel to the first axis of rotation.

17. The vehicle steering wheel according to claim 16, wherein, when the movable structure is in the locked position and when the locking arm pushes the movable abutment against the static abutment, a distance $1L1+1L2$ is greater than a distance $1L3$, wherein:
- $1L1$ is a distance between the first axis of rotation and a point of contact between the locking arm and the movable structure,
- $1L2$ is a distance between the second axis of rotation and the point of contact between the locking arm and the movable structure, and
- $1L3$ is a distance between the first axis of rotation and the second axis of rotation.

18. The vehicle steering wheel according to claim 1, wherein the movable structure further comprises a plurality of locking notches, wherein the locking arm is configured to couple with each locking notch of the plurality of locking notches so as to define a plurality of respective retracted positions for the movable structure.

19. The vehicle steering wheel according to claim 18, wherein the plurality of locking notches forms a rack, wherein the locking arm comprises a locking projection, and wherein the locking projection is configured to couple with the rack.

20. The vehicle steering wheel according to claim 1, wherein the locking device comprises a control portion arranged to be actuated by an electromechanical actuator.

* * * * *